(12) United States Patent
Banavara et al.

(10) Patent No.: US 9,661,874 B2
(45) Date of Patent: May 30, 2017

(54) NUTRITIONAL COMPOSITIONS CONTAINING STRUCTURED FAT GLOBULES AND USES THEREOF

(71) Applicant: Mead Johnson Nutrition Company, Glenview, IL (US)

(72) Inventors: Dattatreya Banavara, Newburgh, IN (US); John Alvey, Evansville, IN (US); Juan Gonzalez, Newburgh, IN (US)

(73) Assignee: Mead Johnson Nutrition Company, Chicago, IL (US)

( * ) Notice: Subject to any disclaimer, the term of this patent is extended or adjusted under 35 U.S.C. 154(b) by 0 days.

(21) Appl. No.: 13/833,765

(22) Filed: Mar. 15, 2013

(65) Prior Publication Data

US 2014/0255539 A1 Sep. 11, 2014

Related U.S. Application Data

(63) Continuation-in-part of application No. 13/794,151, filed on Mar. 11, 2013, and a continuation of application No. 13/794,270, filed on Mar. 11, 2013.

(51) Int. Cl.
*A23L 33/115* (2016.01)
*A23L 33/00* (2016.01)

(52) U.S. Cl.
CPC .............. *A23L 33/115* (2016.08); *A23L 33/40* (2016.08); *A23V 2002/00* (2013.01)

(58) Field of Classification Search
USPC ............................................................ 426/2
See application file for complete search history.

(56) References Cited

U.S. PATENT DOCUMENTS

| 6,475,984 | B2 | 11/2002 | Kirwin et al. | |
|---|---|---|---|---|
| 7,354,896 | B2 * | 4/2008 | Kirwin et al. | 514/5.2 |
| 8,883,219 | B2 | 11/2014 | Van Der Beek et al. | |
| 9,320,294 | B2 | 4/2016 | Van Baalen et al. | |
| 2008/0003329 | A1 | 1/2008 | Rueda et al. | |
| 2008/0003330 | A1 | 1/2008 | Rueda et al. | |
| 2011/0293784 | A1 * | 12/2011 | Wittke | 426/61 |
| 2012/0269929 | A1 | 10/2012 | Lippman et al. | |
| 2013/0052297 | A1 | 2/2013 | Van De Heijning et al. | |
| 2013/0096087 | A1 | 4/2013 | Van Der Beek et al. | |
| 2013/0150306 | A1 | 6/2013 | Wittke | |
| 2014/0199265 | A1 | 7/2014 | Kuang et al. | |
| 2015/0037455 | A1 | 2/2015 | Chichlowski et al. | |
| 2015/0306117 | A1 | 10/2015 | Van Der Beek et al. | |

FOREIGN PATENT DOCUMENTS

| CN | 101316521 A | 12/2008 |
|---|---|---|
| CN | 101370395 A | 2/2009 |
| CN | 102215702 A | 10/2011 |
| EP | 2258218 | 12/2010 |
| EP | 2342974 | 7/2011 |
| EP | 2638810 | 9/2013 |
| FR | 2930406 | 10/2009 |
| JP | H09172962 A | 7/1997 |
| WO | 2005051091 | 5/2005 |
| WO | 2006114790 | 11/2006 |
| WO | 2007073178 | 6/2007 |
| WO | 2010139701 | 12/2010 |
| WO | 2011069987 | 6/2011 |
| WO | 2011150337 | 12/2011 |
| WO | 2012173485 | 12/2012 |

OTHER PUBLICATIONS

Emmett et al. ("Properties of human milk and their relationship with maternal nutrition," Early Human Development, 49 Suppl (1997), p. S7-S28).*
Simonin et al. ("Comparison of the fat content and fat globule size distribution of breast milk from mothers delivering term and preterm," The American Journal of Clinical Nutrition, 40 (1984), p. 820-826).*
McGuire et al. ("Conjugated Linoleic Acid Concentrations of Human Milk and Infant Formula" in Nutrition Research, vol. 17, No. 8 (1997), p. 1277-1283).*
Chen et al. ("Trans Fatty Acid Isomers in Canadian Human Milk" in Lipids, vol. 30, No. 1 (1995), pp. 15-21.*
Gibson et al. ("Fatty acid composition of human colostrum and mature breast milk" in The American Journal of clinical Nutrition, 34 (1981), pp. 252-257).*
Brenna et al. ("Docosahexaenoic and arachidonic acid concentrations in human breast milk worldwide" in Am J. Clin Nutr, 85 (2007), p. 1457-1464).*
Lara-Villoslada et al. ("Beneficial effects of probiotic bacteria isolated from breast milk" in British Journal of Nutrition, 98, Suppl. 1 (2007), pp. S96-S100).*
Coppa et al. ("Prebiotics in human milk: a review" in Digestive and Liver Disease, 38 Suppl. 2 (2006), pp. S291-S294).*
Ménard et al., "Buffalo vs. cow milk fat globules: Size distribution, zeta-potential, compositions in total fatty acids and in polar lipids from the milk fat globule membrane," Food Chemistry, 120 (2010), 544-551.*
Zivkovic et al., "Bovine Milk as a Source of Functional Oligosaccharides for Improving Human Health," Adv. Nutr., 2, (2011), 284-289.*

(Continued)

*Primary Examiner* — Elizabeth Gwartney
(74) *Attorney, Agent, or Firm* — OspreyIP, pllc; James R. Cartiglia; Bethany J. Whelan

(57) ABSTRACT

The present disclosure relates to a lipid source for nutritional compositions, comprising an enriched lipid fraction which comprises structured fat globules. The enriched lipid fraction provides fat globules having a desired size and fatty acid composition and may be stabilized by components such as phospholipids, cholesterol, milk-fat globule membrane protein and combinations thereof. Additionally, the disclosure relates to methods of supporting lipid digestion in a pediatric subject by providing a nutritional composition comprising an enriched lipid fraction having structured fat globules that are more accessible to lipases. The chemical composition, size and structure of the fat globules may improve digestion. The disclosed nutritional compositions may provide additive and or/synergistic beneficial health effects.

20 Claims, No Drawings

(56) References Cited

OTHER PUBLICATIONS

Domellöf et al., "Iron, zinc, copper concentrations in breast milk are independent of maternal mineral status," The American Journal of Clinical Nutrition, 2002, vol. 79, p. 198-204.*
Hale et al., "The Absence of Candida albicans in Milk Samples of Women with Clinical Symptoms of Ductal Candidiasis"—Breastfeeding Medicine, vol. 4, No. 2, 2009, p. 57-61.*
Bosze, Z., et al., "Bioactive components of milk," (ed.), Springer 2008.
Christie, W., "Structure of the triacyl-sn-glycerols in the plasma and milk of the rat and rabbit," J. Dairy Res., (1985), 52, 219-222.
Christie, W., et al., "Structures of the triglycerides of cows' milk, fortified milks (including infant formulae), and human milk," J. Soc. Dairy Tech., 35(1), 22-24—(1982).
Harzer, G. et al., "Changing patterns of human milk lipids in the course of the lactation and during the day," Am. J. Clin. Nutr, 1983;37:612-621.
Keenan, T., et al., "Intracellular Origin of Milk Fat Globules and the Nature of the Milk Fat Globule Membrane," Springer—Verlag 2006.
Mozaffarian, et al., "Trans-Palmitoleic Acid, Metabolic Risk Factors, and New-Onset Diabetes in U.S. Adults," Ann Intern Med 2010; 153(12) 790-799.
Ran-Ressler, R., et al., "Branched Chain Fatty Acids Are Constituents of the Normal Healthy Newborn Gastrointestinal Tract," Pediatr Res 64(6): 605-609, 2008.
Reverchon, E., "Fractional Separation of SCF Extracts from Marjoram Leaves: Mass Transfer and Optimization," J. Supercrit. Fluids, 1992, 5, 256-261.
Reverchon, E., "Supercritical fluid extraction and fractionation of essential oils and related products," J. Supercrit. Fluids, 10 (1997) 1-37.
Taylor, S., et al., "Supercritical Fluid Extraction and Fractionation of Corn Bran Oil," Supercritical Fluids for Sustainable Technology, 5th International Symposium on Supercritical Fluids (ISSF 2000), Apr. 8-12, 2000, Atlanta, Georgia, p. 1-10.
Vlaeminck, B., et al., "Factors affecting odd- and branched-chain fatty acids in milk: A review," Animal Feed Science and Technology 131 (2006) 389-417.
Yadomae, T., "Structure and biological activities of fungal beta-1,3-glucans." Yakugaku Zasshi. 2000;120:413-431.
MacGibbon, A., et al., Advanced Dairy Chemistry 2: Lipids, (eds. P.F. Fox & P.L.H. McSweeney), 3rd ed., pp. 1-42 (2006).
Armand, M., et al., "Effect of Human Milk or Formula on Gastric Function and Fat Digestion in the Premature Infant," Pediatric Research (1996) 40, 429-437.
Huang, M., et al., "Comparison of Lipid in Milk and Breast Milk," China Dairy Industry, vol. 19, No. 4, Aug. 29, 1991.
Michalski, M.C., et al., "Size Distribution of Fat Globules in Human Colostrum, Breast Milk, and Infant Formula," Journal of Dairy Science, vol. 88, No. 6, Dec. 31, 2005.
Wang, Y., et al., "Milk Biochemistry," Dec. 31, 1995, pp. 41, 51-72.

* cited by examiner nel# NUTRITIONAL COMPOSITIONS CONTAINING STRUCTURED FAT GLOBULES AND USES THEREOF This application is a continuation of co-pending U.S. patent application Ser. No. 13/794,151, filed on Mar. 11, 2013 and entitled "Nutritional Compositions Containing an Enriched Lipid Fraction and Uses Thereof," which is incorporated herein by reference.

TECHNICAL FIELD

The present disclosure relates generally to a lipid source for nutritional compositions, comprising an enriched lipid fraction which comprises structured fat globules. The enriched lipid fraction provides fat globules having a desired size and fatty acid composition and may be stabilized by components such as phospholipids, cholesterol, milk-fat globule membrane protein and combinations thereof. In an embodiment, the fat globules of the present disclosure are similar in size to naturally occurring milk fat globules.

Additionally, the disclosure relates to methods of supporting lipid digestion in a pediatric subject by providing a nutritional composition comprising an enriched lipid fraction having structured fat globules that are more accessible to lipases. The chemical composition, size and structure of the fat globules may improve digestion. The disclosed nutritional compositions may provide additive and or/synergistic beneficial health effects.

BACKGROUND ART

Lipids constitute a broad group of naturally occurring molecules that include fats. In addition to fats, lipids may also include waxes, sterols, fat-soluble vitamins, monoglycerides, diglycerides, triglycerides, phospholipids, fatty acids, glycerophospholipids, sphingolipids, saccharolipids, polyketides, prenol lipids and sterol lipids, for example cholesterol. Lipids are vital components of cell membranes and have several forms and functions, are involved in many metabolic processes and are one of the major multifunctional agents present in human milk. Lipids also provide a form of energy storage and act as vehicles for absorption and transport of fat-soluble vitamins.

Fats are a subgroup of lipids generally referred to as triglycerides; they are a concentrated source of energy that can provide over 30% and up to 70% or more of dietary calories. Fat facilitates the absorption of fat-soluble vitamins and supplies essential fatty acids.

Milk, such as bovine milk, is a complex emulsion that contains several classes of components, including lipids and fats, which fulfill nutritional requirements and/or deliver special health benefits to the consumer. The fat component of milk exists in the form of globules which have a diameter which ranges in size from 0.1 to 20 micrometers. The presence of fat globules and the size and composition of the fat globules in milk contribute to the nutritional properties and other characteristics of milk.

The fat globules in milk comprise about 98% triacylglycerols ("TAGs") and are stabilized by a cellular milk fat globule membrane ("MFGM"). Structurally, TAGs are derived from glycerol and include three fatty acid moieties. Upon digestion the fatty acids attached to the glycerol backbone are cleaved by digestional lipases and used by the body as nutrients. Accordingly, TAGs are the major storage form of energy in animals.

Milk may contain a variety of fatty acids, either as free fatty acids or as part of a TAG. For example milk fat may comprise saturated fatty acids, trans-fatty acids, monounsaturated fatty acids, polyunsaturated fatty acids, odd- and branched chain fatty acids ("OBCFAs"), branched chain fatty acids ("BCFAs") and/or conjugated linoleic acid ("CLA").

MFGM is the membrane surrounding the lipid droplets, which includes the fatty acids and TAGs, found in milk. MFGM consists of a complex mixture of phospholipids, proteins, glycoproteins, triglycerides, cholesterol, enzymes and other minor components. The chemical composition of MFGM is close to that of a cell membrane, typically having a bilayer composed of fatty acids and/or phospholipids. In bovine milk, the MFGM accounts for 2-6% of the mass of the milk fat globules.

One important property of milk fat globules is their size, both in terms of the average size of the total fat globules found in milk and the range or distribution of the fat globule sizes found in milk. In naturally occurring milk fat globules, the size of the globule can cause variations in the actual fatty acid composition of the triacyglcerols of the globule. For example, smaller milk fat globules contain more $C_{18:0}$ and more $C_{18:1}$ fatty acids than do larger milk fat globules.

Particularly with respect to human milk, the size of the fat globules vary with time postpartum, and are generally in the range of about 2.5 µm to about 5.0 µm, volume-surface average diameter, or from about 3.0 µm to about 6.0 µm, volumic average diameter. The specific surface area of human milk is, generally speaking, between about 1.0 m²/g and about 2.0 m²/g, and the mean free distance between fat globules in the human milk emulsion is understood to be between about $15^5$ µm and about $19^5$ µm. In the case of human milk, participation of milk proteins in the MFGM is minimal, with most milk proteins existing free in the emulsion, rather than forming an element of the MFGM.

During breastfeeding, the infant's suckling action produces lingual lipases in the mouth; these lingual lipases are active at a lower pH than pancreatic lipases. The phospholipid layer surrounding the human milk fat globules is relatively porous, and gets exposed to the lingual lipases in the stomach, which leads to release of free and monoacylglycerols of C8, C10, C12 and C14 fatty acids. These fatty acids have an antiviral and antibacterial effect, which help protect the infant. Moreover, the presence of lingual lipases facilitates the rapid digestion of fat in the infant's stomach, especially since bile salt dependent lipase ("BSDL") and co-lipase dependent lipase ("CDL"), two of the other primary mechanisms of fat digestion in humans, are present at relatively low levels in infants.

While the size of fat globules in bovine milk is comparable to human milk, the situation changes when the bovine milk is homogenized. Homogenization of bovine milk can break the MFGM and/or increase the surface area of the globules by decreasing the fat globule size to less than 2 µm (volume-surface average diameter) or less than 3 µm (volumic average diameter). Casein micelles surround the membrane after homogenization and, when pasteurized, whey proteins are denatured and whey and casein surround the bovine milk fat globules, with MFGM components like phospholipids pushed to the aqueous medium.

With respect to commercially available pediatric nutritional compositions like infant formulas, many contain a lipid source from vegetable oils stabilized by added proteins and/or emulsifiers, with a globule size of less than 1.6 µm (volume-surface average diameter) or 2.2 µm (volumetric average diameter). The specific surface area of the infant formula fat globules is believed to be above 5.0 m²/g, and often significantly above 5.0 m²/g. These infant formula fat globules often have a dense cloud of denatured proteins surrounding the globule. Thus, the proteins need to be digested by gastric proteases before the globules can be accessed by lipases for lipid digestion. And, the relatively small globule size and higher surface area requires more proteases at a lower pH than larger globules would.

Moreover, the lipid source provided by vegetable oils lacks certain components of milk fat or milk fat globule membrane that are known to play an important role in pediatric and/or infant health and development. Replacing milk fat in nutritional compositions, such as infant formula, with vegetable oils may have other draw-backs, including non-reversible component interactions between proteins, lipids and minerals found in the nutritional compositions.

Therefore, pediatric subjects who consume infant formulas or pediatric nutritional compositions that have a fat source stabilized by added proteins may not be receiving adequate lipid nutrition.

Accordingly, it would be beneficial to provide a nutritional composition having an enriched lipid fraction that includes fat globules that are similar in size and composition to human milk fat globules. Additionally, since naturally occurring fat globule size can affect fatty acid composition of the milk fat globules, it would be beneficial to provide enriched lipid fractions that include milk fat globules of a desired size and fatty acid composition.

Further, it would be beneficial to provide milk fat globules that are stabilized by components similar to those found in the human milk, such as phospholipids, cholesterol and milk fat globule membrane proteins, instead of other added proteins and emulsifiers. Additionally, it is beneficial to provide a method of promoting digestion in a pediatric subject by providing a nutritional composition that contains a lipid source comprising an enriched lipid fraction having milk fat globules similar in chemical composition and size to those found in human milk.

BRIEF SUMMARY

Briefly, the present disclosure is directed, in an embodiment, to a nutritional composition that contains a carbohydrate source, a protein source and a lipid source comprised of an enriched lipid fraction derived from milk, and that comprises milk fat globules.

In some embodiments, the milk fat globules may include saturated fatty acids, trans-fatty acids, monounsaturated fatty acids, polyunsaturated fatty acids, cholesterol, odd- and branched chain fatty acids ("OBCFAs"), branched chain fatty acids ("BCFAs"), conjugated linoleic acid ("CLA"), phospholipids, or milk fat globule membrane protein, and mixtures thereof.

The enriched lipid fraction, and milk fat globules contained therein, may be used as the sole fat source in a nutritional composition or may be used in combination with other fat sources including, but not limited to, a vegetable fat source.

In one embodiment, the nutritional composition containing the milk fat globules may be an infant formula. The addition of the milk fat globules provides an enriched fat and lipid source to the infant that may be more fully digested by a pediatric subject.

In certain embodiments the nutritional composition may optionally contain at least one prebiotic, at least one probiotic, a source of long chain polyunsaturated fatty acids ("LCPUFAs"), for example docosahexaenoic acid ("DHA") and/or arachidonic acid ("ARA"), β-glucan, a source of iron, and mixtures of one or more thereof.

Additionally, the disclosure is directed to a method of promoting lipid digestion in a pediatric subject by providing a nutritional composition that includes milk fat globules.

It is to be understood that both the foregoing general description and the following detailed description present embodiments of the disclosure and are intended to provide an overview or framework for understanding the nature and character of the disclosure as it is claimed. The description serves to explain the principles and operations of the claimed subject matter. Other and further features and advantages of the present disclosure will be readily apparent to those skilled in the art upon a reading of the following disclosure.

DETAILED DESCRIPTION

Reference now will be made in detail to the embodiments of the present disclosure, one or more examples of which are set forth herein below. Each example is provided by way of explanation of the nutritional composition of the present disclosure and is not a limitation. In fact, it will be apparent to those skilled in the art that various modifications and variations can be made to the teachings of the present disclosure without departing from the scope of the disclosure. For instance, features illustrated or described as part of one embodiment, can be used with another embodiment to yield a still further embodiment.

Thus, it is intended that the present disclosure covers such modifications and variations as come within the scope of the appended claims and their equivalents. Other objects, features and aspects of the present disclosure are disclosed in or are apparent from the following detailed description. It is to be understood by one of ordinary skill in the art that the present discussion is a description of exemplary embodiments only and is not intended as limiting the broader aspects of the present disclosure.

The present disclosure relates generally to a fat source for nutritional compositions, the fat source containing milk fat globules derived from milk. Additionally, the disclosure relates to methods of promoting lipid digestion in a pediatric subject by providing a nutritional composition comprising a fat source that includes milk fat globules.

"Nutritional composition" means a substance or formulation that satisfies at least a portion of a subject's nutrient requirements. The terms "nutritional(s)", "nutritional formula (s)", "enteral nutritional(s)", and "nutritional supplement(s)" are used as non-limiting examples of nutritional composition(s) throughout the present disclosure. Moreover, "nutritional composition(s)" may refer to liquids, powders, gels, pastes, solids, concentrates, suspensions, or ready-to-use forms of enteral formulas, oral formulas, formulas for infants, formulas for pediatric subjects, formulas for children, growing-up milks and/or formulas for adults.

"Pediatric subject" means a human less than 13 years of age. In some embodiments, a pediatric subject refers to a human subject that is between birth and 8 years old. In other embodiments, a pediatric subject refers to a human subject between 1 and 6 years of age. In still further embodiments, a pediatric subject refers to a human subject between 6 and 12 years of age. The term "pediatric subject" may refer to infants (preterm or full term) and/or children, as described below.

"Infant" means a human subject ranging in age from birth to not more than one year and includes infants from 0 to 12 months corrected age. The phrase "corrected age" means an infant's chronological age minus the amount of time that the infant was born premature. Therefore, the corrected age is the age of the infant if it had been carried to full term. The term infant includes low birth weight infants, very low birth weight infants, and preterm infants. "Preterm" means an infant born before the end of the 37$^{th}$ week of gestation. "Full term" means an infant born after the end of the 37$^{th}$ week of gestation.

"Child" means a subject ranging in age from 12 months to about 13 years. In some embodiments, a child is a subject between the ages of 1 and 12 years old. In other embodiments, the terms "children" or "child" refer to subjects that are between one and about six years old, or between about seven and about 12 years old. In other embodiments, the terms "children" or "child" refer to any range of ages between 12 months and about 13 years.

"Infant formula" means a composition that satisfies at least a portion of the nutrient requirements of an infant. In the United States, the content of an infant formula is dictated by the federal regulations set forth at 21 C.F.R. Sections 100, 106, and 107. These regulations define macronutrient, vitamin, mineral, and other ingredient levels in an effort to simulate the nutritional and other properties of human breast milk.

"Fractionation procedure" includes any process in which a certain quantity of a mixture is divided up into a number of smaller quantities known as fractions. The fractions may be different in composition from both the mixture and other fractions. Examples of fractionation procedures include but are not limited to, melt fractionation, solvent fractionation, supercritical fluid fractionation and/or combinations thereof.

The term "growing-up milk" refers to a broad category of nutritional compositions intended to be used as a part of a diverse diet in order to support the normal growth and development of a child between the ages of about 1 and about 6 years of age.

"Fat globule" refers to a small mass of fat surrounded by phospholipids and other membrane and/or serum proteins, where the fat itself can be a combination of any vegetable or animal fat.

"Milk" means a component that has been drawn or extracted from the mammary gland of a mammal. In some embodiments, the nutritional composition comprises components of milk that are derived from domesticated ungulates, ruminants or other mammals or any combination thereof.

"Nutritionally complete" means a composition that may be used as the sole source of nutrition, which would supply essentially all of the required daily amounts of vitamins, minerals, and/or trace elements in combination with proteins, carbohydrates, and lipids. Indeed, "nutritionally complete" describes a nutritional composition that provides adequate amounts of carbohydrates, lipids, essential fatty acids, proteins, essential amino acids, conditionally essential amino acids, vitamins, minerals and energy required to support normal growth and development of a subject.

A nutritional composition that is "nutritionally complete" for a full term infant will, by definition, provide qualitatively and quantitatively adequate amounts of all carbohydrates, lipids, essential fatty acids, proteins, essential amino acids, conditionally essential amino acids, vitamins, minerals, and energy required for growth of the full term infant.

A nutritional composition that is "nutritionally complete" for a child will, by definition, provide qualitatively and quantitatively adequate amounts of all carbohydrates, lipids, essential fatty acids, proteins, essential amino acids, conditionally essential amino acids, vitamins, minerals, and energy required for growth of a child.

"Branched Chain Fatty Acid" ("BCFA") means a fatty acid containing a carbon constituent branched off the carbon chain. Typically the branch is an alkyl branch, especially a methyl group, but ethyl and propyl branches are also known. The addition of the methyl branch lowers the melting point compared with the equivalent straight chain fatty acid. This includes branched chain fatty acids with an even number of carbon atoms in the carbon chain. Examples of these can be isomers of tetradecanoic acid, hexadecanoic acid.

"Odd- and Branched-Chain Fatty Acid" ("OBCFA") is a subset of BCFA that has an odd number of carbon atoms and have one or more alkyl branches on the carbon chain. The main odd- and branched-chain fatty acids found in bovine milk include, but are not limited to, the isomers of tetradecanoic acid, pentadecanoic acid, hexadecanoic acid, and heptadecanoic acid. For the purposes of this disclosure, the term "BCFA" includes both branched-chain fatty acids and odd-and-branched chain fatty acids.

"Trans-fatty acid" means an unsaturated fat with a trans-isomer. Trans-fats may be monounsaturated or polyunsaturated. Trans refers to the arrangement of the two hydrogen atoms bonded to the carbon atoms involved in a double bond. In the trans arrangement, the hydrogens are on opposite sides of the bond. Thus a trans-fatty acid is a lipid molecule that contains one or more double bonds in trans geometric configuration.

"Phospholipids" means an organic molecule that contains a diglyceride, a phosphate group and a simple organic molecule. Examples of phospholipids include but are not limited to, phosphatidic acid, phosphatidylethanolamine, phosphatidylcholine, phosphatidylserine, phsphatidylinositol, phosphatidylinositol phosphate, phosphatidylinositol biphosphate and phosphatidylinositol triphosphate, ceramide phosphorylcholine, ceramide phosphorylethanolamine and ceramide phosphorylglycerol. This definition further includes sphigolipids, glycolipids, and gangliosides.

The nutritional composition of the present disclosure may be substantially free of any optional or selected ingredients described herein, provided that the remaining nutritional composition still contains all of the required ingredients or features described herein. In this context, and unless otherwise specified, the term "substantially free" means that the selected composition may contain less than a functional amount of the optional ingredient, typically less than 0.1% by weight, and also, including zero percent by weight of such optional or selected ingredient.

All percentages, parts and ratios as used herein are by weight of the total composition, unless otherwise specified.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

As used herein, the term "about" should be construed to refer to both of the numbers specified as the endpoint(s) of any range. Any reference to a range should be considered as providing support for any subset within that range.

The present disclosure is directed to nutritional compositions containing a carbohydrate source, a protein source, and a fat source wherein the fat source comprises milk fat globules. In some embodiments the milk fat globules may include saturated fatty acids, trans-fatty acids, monounsaturated fatty acids, polyunsaturated fatty acids, OBCFAs, BCFAs, CLA, cholesterol, phospholipids, or milk fat globule membrane proteins, and mixtures of two or more thereof.

The milk fat globules may have an average diameter (volume-surface area average diameter) of at least about 2 µm. In some embodiments, the average diameter is in the range of from about 2 µm to about 13 µm. In other embodiments, the milk fat globules may range from about 2.5 µm to about 10 µm. Still in other embodiments, the milk fat globules may range in average diameter from about 3 µm to about 6 µm. The specific surface area of the globules is, in certain embodiments, less than 3.5 $m^2/g$, and in other embodiments is between about 0.9 $m^2/g$ to about 3 $m^2/g$. The desired milk fat globule size may be formulated to be comparable to milk fat globules found in human breast milk. Without being bound by any particular theory, it is believed that milk fat globules of the aforementioned sizes are more accessible to lipases therefore leading to better digestion lipid digestion.

In some embodiments where the milk fat globules contain saturated fatty acids, the saturated fatty acids may be present in a concentration from about 0.1 g/100 kcal to about 8.0 g/100 kcal. In certain embodiments the saturated fatty acids may be present from about 0.5 g/100 kcal to about 2.0 g/100 kcal. In still other embodiments the saturated fatty acids may be present from about 3.5 g/100 kcal to about 6.9 g/100 kcal.

Examples of saturated fatty acids suitable for inclusion in the milk fat globules include, but are not limited to, butyric, valeric, caproic, caprylic, decanoic, lauric, myristic, palmitic, stearic, arachidic, behenic, alignoceric, tetradecanoic, hexadecanoic, palmitic, and octadecanoic acid, and/or combinations and mixtures thereof.

Additionally, the milk fat globules may comprise, in some embodiments, lauric acid. Lauric acid, also known as dodecanoic acid, is a saturated fatty acid with a 12-carbon atom chain and is believed to be one of the main antiviral and antibacterial substances currently found in human breast milk. The milk fat globules may be enriched with triglycerides containing lauric acid at either the Sn-1, Sn-2 and/or Sn-3 positions. Without being bound by any particular theory, it is believed that when the enriched lipid fraction is ingested, the mouth lingual lipase and pancreatic lipase will hydrolyze the triglycerides to a mixture of glycerides including mono-lauric and free lauric acid.

The concentration of lauric acid in the globules varies from 80 mg/100 ml to 800 mg/100 ml. The concentration of monolauryl n the globules can be in the range of 20 mg/100 ml to 300 mg/100 ml feed. In some embodiments, the range is 60 mg/100 ml to 130 mg/100 ml The milk fat globules may contain trans-fatty acids in certain embodiments. The trans-fatty acids included in the milk fat globules may be monounsaturated or polyunsaturated trans-fatty acids. In some embodiments the trans-fatty acids may be present in an amount from about 0.2 g/100 kcal to about 7.0 g/100 kcal. In other embodiments the trans-fatty acids may be present in an amount from about 3.4 g/100 kcal to about 5.2 g/100 kcal. In yet other embodiments the trans-fatty acids may be present from about 1.2 g/100 kcal to about 4.3 g/100 kcal.

Examples of trans-fatty acids for inclusion in the milk fat globules include, but are not limited to, vaccenic, or elaidic acid, and mixtures thereof. Moreover, when consumed, mammals convert vaccenic acid into rumenic acid, which is a conjugated linoleic acid that exhibits anticarcinogenic properties. Additionally, a diet enriched with vaccenic acid may help lower total cholesterol, LDL cholesterol and triglyceride levels.

In some embodiments where the milk fat globules contain OBCFAs, these OBCFAs may be present in an amount from about 0.3 g/100 kcal to about 6.1 g/100 kcal. In other embodiments OBCFAs may be present in an amount from about 2.2 g/100 kcal to about 4.3 g/100 kcal. In yet another embodiment OBCFAs may be present in an amount from about 3.5 g/100 kcal to about 5.7 g/100 kcal. In still other embodiments, the milk fat globules comprise at least one OBCFA.

Typically, an infant may absorb OBCFAs while in utero and from the breast milk of a nursing mother. Therefore, OBCFAs that are identified in human milk are preferred for inclusion in the milk fat globules of the nutritional composition. Addition of OBCFAs to infant or children's formulas allows such formulas to mirror the composition and functionality of human milk and to promote general health and well-being.

In some embodiments, the milk fat globules may comprise BCFAs. In some embodiments the BCFAs are present at a concentration from about 0.2 g/100 kcal and about 5.82 g/100 kcal. In another embodiment, the milk fat globules contain BCFAs from about 2.3 g/100 kcal to about 4.2 g/100 kcal. In yet another embodiment the milk fat globules contain BCFAs from about 4.2 g/100 kcal to about 5.82 g/100 kcal. In still other embodiments, the milk fat globules comprise at least one BCFA.

BCFAs that are identified in human milk are preferred for inclusion in the nutritional composition. Addition of BCFAs to infant or children's formulas allows such formulas to mirror the composition and functionality of human milk and to promote general health and well-being.

In certain embodiments the milk fat globules may comprise CLA. In some embodiments CLA may be present in a concentration from about 0.4 g/100 kcal to about 2.5 g/100 kcal. In other embodiments CLA may be present from about 0.8 g/100 kcal to about 1.2 g/100 kcal. In yet other embodiments CLA may be present from about 1.2 g/100 kcal to about 2.3 g/100 kcal. In still other embodiments, the milk fat globules comprise at least one CLA.

CLAs that are identified in human milk are preferred for inclusion in the nutritional composition. Typically, CLAs are absorbed by the infant from the human milk of a nursing mother. Addition of CLAs to infant or children's formulas allows such formulas to mirror the composition and functionality of human milk and to promote general health and well being.

Examples of CLAs found in the milk fat globules for the nutritional composition include, but are not limited to, cis-9, trans-11 CLA, trans-10, cis-12 CLA, cis-9, trans-12 octadecadienoic acid, and mixtures thereof.

The milk fat globules of the present disclosure comprise monounsaturated fatty acids in some embodiments. The milk fat globules may be formulated to include monounsaturated fatty acids from about 0.8 g/100 kcal to about 2.5 g/100 kcal. In other embodiments the milk fat globules may include monounsaturated fatty acids from about 1.2 g/100 kcal to about 1.8 g/100 kcal.

Examples of monounsaturated fatty acids suitable for the milk fat globules include, but are not limited to, palmitoleic acid, cis-vaccenic acid, oleic acid, and mixtures thereof.

In certain embodiments, the milk fat globules of the present disclosure comprise polyunsaturated fatty acids from about 2.3 g/100 kcal to about 4.4 g/100 kcal. In other embodiments, the milk fat globules comprise polyunsaturated fatty acids from about 2.7 g/100 kcal to about 3.5 g/100 kcal. In yet another embodiment, the milk fat globules comprises polyunsaturated fatty acids from about 2.4 g/100 kcal to about 3.3 g/100 kcal.

In some embodiments, the milk fat globules of the present disclosure comprise polyunsaturated fatty acids, such as, for example linoleic acid, linolenic acid, octadecatrienoic acid, arachidonic acid (ARA), eicosatetraenoic acid, eicopsapentaenoic acid (EPA), docosapentaenoic acid (DPA), and docosahexaenoic acid (DHA). Polyunsaturated fatty acids are the precursors for prostaglandins and eicosanoids, which are known to provide numerous health benefits, including, anti-inflammatory response, cholesterol absorption, and increased bronchial function.

The milk fat globules of the present disclosure can also comprise cholesterol in some embodiments from about 100 mg/100 kcal to about 400 mg/100 kcal. In another embodiment, the milk fat globules may comprise cholesterol from about 200 mg/100 kcal to about 300 mg/100 kcal. As is similar to human milk and bovine milk, the cholesterol included in the milk fat globules may be present in the outer bilayer membrane of the milk fat globule to provide stability to the globular membrane.

In some embodiments, the milk fat globules of the present disclosure comprises phospholipids from about 50 mg/100 kcal to about 200 mg/100 kcal. In other embodiments, the milk fat globules of the present disclosure may comprise phospholipids from about 75 mg/100 kcal to about 150 mg/100 kcal. In yet other embodiments, the milk fat globules comprise phospholipids from about 100 mg/100 kcal to about 250 mg/100 kcal.

Phospholipids are found in human milk lipids at levels of about 20 to 40 mg/dl. In certain embodiments, phospholipids may be incorporated into the milk fat globules to stabilize the milk fat globule by providing a phospholipid membrane or bilayer phospholipid membrane. Therefore, in some embodiments the milk fat globules may be formulated with higher amounts of phospholipids than those found in human milk.

The phospholipid composition of human milk lipids, as the weight percent of total phospholipids, is phosphatidylcholine ("PC") 24.9%, phosphatidylethanolamine ("PE") 27.7%, phosphatidylserine ("PS") 9.3%, phosphatidylinositol ("PI") 5.4%, and sphingomyelin ("SPGM") 32.4%, (Harzer, G. et al., Am. J. Clin. Nutr., Vol. 37, pp. 612-621 (1983)). Thus in one embodiment, the milk fat globules comprise one or more of PC, PE, PS, PI, SPGM, and mixtures thereof. Further, the phospholipid composition included in the milk fat globules may be formulated to provide certain health benefits by incorporating desired phospholipids.

In certain embodiments, the milk fat globules of the present disclosure comprise milk fat globule membrane protein. In some embodiments, the milk fat globule membrane protein is present from about 50 mg/100 kcal to about 500 mg/100 kcal.

Galactolipids may be included, in some embodiments, in the milk fat globules of the present disclosure. For purposes of this disclosure "galactolipids" refer to any glycolipid whose sugar group is galactose. More specifically, galactolipids differ from glycosphingolipids in that they do not have nitrogen in their composition. Galactolipids play an important role in supporting brain development and overall neuronal health. Additionally, the galactolipids, galactocerebroside and sulfatides constitute about 23% and 4% of total myelin lipid content respectively, and thus may be incorporated into the milk fat globules in some embodiments.

For the purposes of this disclosure, some amounts of the lipid components of the milk fat globules, such as, saturated fatty acids, trans-fatty acids, monounsaturated fatty acids, polyunsaturated fatty acids, OBCFAs, CLA, BCFAs, cholesterol, phospholipids, and milk fat globule membrane proteins may be inherently present in known ingredients, such as natural oils or protein sources, that are commonly used to make nutritional compositions for pediatric subjects. These inherent lipid components are not considered part of the lipid component contained in the milk fat globules described in the present disclosure. The concentrations and ratios of the lipid components of the milk fat globules as described herein are calculated based only upon the lipid components that are present in the milk fat globules of the present disclosure.

The enriched lipid fraction derived from milk that includes the milk fat globules of the present disclosure may be produced by any number of fractionation techniques. These techniques include but are not limited to melting point fractionation, organic solvent fractionation, super critical fluid fractionation, and any variants and combinations thereof. For example, selected fractions of milk may be combined to create milk fat globules of desired size and geometries.

As noted, melting point fractionation may be used to produce the enriched lipid fraction of the present disclosure. Generally if the starting material is high in fat, for example butter, anhydrous milk fat or butter oil, melting point fractionation is used to separate the lipid portions based on the melting point of different triglycerides. Melting point fractionation may be especially useful for fractionating milk fat since milk triglycerides have a wide range of melting points (4° C. to 40° C.). The process for enriching the lipid fractions is to separate olein and stearin fractions of milkfat below 26° C. and from olein 26, the fraction is conducted using temperatures between 10° C.-26° C. at 2° C. intervals. Based on the triglyceride separations in each fraction, the oleins and stearins are combined to obtain the enriched lipid fraction used in the composition mentioned here.

Any melting point fractionation procedure well-known in the art may be used to develop the enriched lipid fraction described herein. Details of techniques used to monitor melting point fractionation process parameters are set for in Deffense, E., JAOCS, 70(12): 1193 (1993); Grall, D. S. and Hartel, R. W. JAOCS, 69: 741 (1992).

Supercritical fluid fractionation may also be used to produce the enriched lipid fraction of the present disclosure. Generally, this procedure utilizes a supercritical fluid, typically $CO_2$, and a fractionation column having sections of varying temperatures and pressures. Supercritical fluid and the complex mixture, in the case of the current disclosure a milk sample, flow counter-currently through separation sections located within the column to extract certain fractions from the complex mixture. Fractions are then removed from the top of the column and the bottom of the column.

Any super critical fractionation procedure well-known in the art may be used herein to develop the enriched lipid fraction derived from milk. Such super critical fluid fractionation methods include the following methods taught in J. W. King et al., Supercritical Fluid Technology in Oil and Lipid Chemistry, AOCS Press, Champaign, Ill., pg. 435, 1996; Reverchon, E., J. Supercrit. Fluids, Vol. 5, pg. 256, 1992; Reverchon, E., Supercritical fluid extraction and fractionation of essential oils and related products. J. Supercrit. Fluids, 10 (1997) 1-37; Taylor, Scott L. and King, Jerry. W., *Supercritical Fluid Extraction and Fractionation of Corn Bran Oil*. National Center for Agricultural Utilization Research, Agricultural Research Services, United States Department of Agriculture. In order to obtain the lipid fractions mentioned here, extractions were conducted with $CO_2$ at between 20-35 C and 5 Mpa to 40 Mpa. Certain fractions of extracts are mixed together to achieve the desired composition mentioned below.

In some embodiments, organic solvent fractionation may be utilized to produce milk fat fraction suitable for formulating the milk fat globules of the present disclosure. In other embodiments, supercritical fluid fractionation may also be used to produce milk fat fractions suitable for formulating the milk fat globules of the present disclosure. Any organic solvent fractionation procedure or super critical fractionation procedure well-known in the art may be used herein to develop the milk fat globules derived from milk.

Mixtures that may be subjected to the fractionation procedures to produce the milk fat globules include, but are not limited to, bovine whole milk, bovine cream, caprine milk, ovine milk, yak milk and/or mixtures thereof. In a preferred embodiment the milk mixture used to create the milk fat globules is bovine milk.

The following examples introduce milk fat fractions that may be produced by a fractionation procedure. The milk fat after fractionation column illustrates milk fat fractions that can be combined to create milk fat globules, which can be incorporated into the nutritional composition(s) of the present disclosure.

Example 1

Illustrated below is a lipid profile of fractionated milk fat (butter, plastic cream) produced by melting point, i.e. Melt-Frac, fractionation procedure.

| Proposed lipid profile of fractionated milk fat (Using Meltfrac) | | |
|---|---|---|
| Fatty acid | Milk Fat Actual (g/100 g) | After fractionation (g/100 g) |
| 4:0 | 4.4 | 1.0 |
| 6:0 | 2.4 | 1.0 |
| 8:0 | 1.4 | 0.5 |
| 10:0 | 2.7 | 1.5 |
| 12:0 | 3.3 | 4.0 |
| 13:0 | 0.12 | 0.3 |
| 14:0 | 10.9 | 12.0 |
| 15:0 | 0.9 | 1.8 |
| 16:0 | 30.6 | 18.0 |
| 17:0 | 0.4 | 1.0 |
| 18:0 | 12.2 | 8.0 |
| 20:0 | 0.2 | 0.1 |
| Saturated fatty acids total | 69.52 | 49.2 |
| 10:1 | 0.3 | 0.6 |
| 14:1 | 0.8 | 1.6 |
| 16:1 | 1 | 3.0 |
| 17:1 | 0.2 | 0.5 |
| 18:1 | 22.8 | 35.0 |
| Mono-unsaturated faty acids, cis, total | 25.1 | 40.7 |
| 18:2 | 1.6 | 3.0 |
| 18:3 | 0.7 | 1.4 |
| Poly-unsaturated fatty acids, cis, total | 2.3 | 4.4 |
| 16:1t | 0.4 | 0.8 |
| 18:1t | 2.1 | 3.0 |
| 18:2t | 0.2 | 0.6 |
| Trans fatty acids total | 2.7 | 5.2 |
| CLA | 0.4 | 0.8 |
| Cholesterol mg/100 g | 300 | 400 |
| phospholipids | 0.05 | 0.2 |
| Total | 99.6 | 99.7 |

Example 2

Illustrated below is a lipid profile of fractionated milk fat (butter, plastic cream) produced by supercritical extraction and other solvent techniques.

| Proposed composition of of fractionated milk/cream fraction (Using supercritical extraction/other solvent techniques) Fatty acid | Before Enrichment Percent | After Enrichment |
|---|---|---|
| 4:0 | 4.4 | 2.0 |
| 6:0 | 2.4 | 2.0 |
| 8:0 | 1.4 | 2.5 |
| 10:0 | 2.7 | 4.0 |
| 13:0 | 0.12 | 0.3 |
| 12:0 | 3.3 | 4.0 |
| 14:0 | 10.9 | 8.0 |
| 15:0 | 0.9 | 3.0 |
| 16:0 | 30.6 | 18.0 |
| 17:0 | 0.4 | 0.8 |
| 18:0 | 12.2 | 6.0 |
| 20:0 | 0.2 | 0.1 |
| Saturated fatty acids total | 69.5 | 50.7 |
| 10:1 | 0.3 | 0.6 |
| 14:1 | 0.8 | 1.6 |
| 16:01 | 1 | 3.0 |
| 17:01 | 0.1 | 0.2 |
| 18:01 | 22.8 | 30.0 |
| Mono-unsaturated faty acids, cis, total | 25.0 | 35.4 |
| 18:02 | 1.6 | 3.0 |
| 18:03 | 0.7 | 1.4 |
| Poly-unsaturated fatty acids, cis, total | 2.3 | 4.4 |
| 16:1t | 0.4 | 0.4 |
| 18:1t | 2.1 | 2.5 |
| 18:2t | 0.2 | 0.6 |
| Trans fatty acids total | 3.1 | 4.3 |
| CLA | 0.4 | 0.8 |

| Proposed composition of of fractionated milk/cream fraction (Using supercritical extraction/other solvent techniques) Fatty acid | Before Enrichment Percent | After Enrichment |
|---|---|---|
| Cholesterol mg/100 g | 300 | 400 |
| Phospholipids (including sphingolipids, glycoplipids, gangliosides) | 1 | 3-6 |
| MFGM proteins mg/100 g | 100 | 500 |
| Total | 100.9 | 100.8 |

As illustrated by the foregoing examples, different fractionation procedures will produce fractions of milk that differ in both fatty acid and lipid composition and concentration. Thus, a certain fractionation procedure or combination of fractionation procedures may be utilized to produce lipid fractions with certain desired fatty acid composition and concentrations. Accordingly, the lipid fractions having different fatty acid compositions may be formulated to provide the milk fat globules of the present disclosure.

Example 3

An analysis was then conducted to determine if the fat globules produced by the disclosed fractionation process are comparable to human milk fat globules or conventional infant formula globules.

Commercial infant formula, Enfamil Newborn (available from Mead Johnson Nutrition Company, Glenview, Ill., U.S.) was used as a control and reconstituted and the fat globule particle size was measured (volume-surface average diameter) as having a mean of 1.555 µm and a median of 0.962 µm, with a mean to median ratio of 1.617. Another sample of Enfamil Newborn was prepared, this time including fat globules prepared in accordance with this disclosure in place of some of the fat source, and the fat globule particle size was measured as having a mean of 3.317 µm and a median of 2.747 µm.

Each of the samples was then digested by lipase (pancreatin) for two hours, and the free fatty acids measured. The control formula had a mean fat globule size of 20.41 µm and a median of 15.72 µm. The free fatty acid content of the control was measured as 2.1%. The formula having the fat globules derived from the fraction of the present disclosure had a mean fat globule size of 8.549 µm and a median of 3.943 µm after digestion; the free fatty acid content was measured as 4.1%.

Thus, the formula with fat globules produced in accordance with this disclosure had a bigger fat globule size initially, but the fat globule size was less affected by digestion, showing minimal participation of proteins at the interface. Moreover, better digestion by the lipase was seen, as evidenced by the higher free fatty acid percentage.

Additionally, certain embodiments of this disclosure are directed toward a method for providing lipid fractions derived from milk that may be combined to produce certain milk fat globules of a desired shape, size and/or lipid composition.

Milk fractions produced after a fractionation procedure, such as the ones identified in Examples 1-2, may be selected and combined to create the milk fat globules. For example, milk fractions with differing lipid concentrations and compositions may be combined to formulate milk fat globules with a desired lipid composition or size. In certain geographical regions it may be desirable to have certain levels of one or more of the milk fat components to meet nutritional requirements for a pediatric subject in that region; those levels may differ from region to region.

Once the desired milk fat globules are obtained, they may be incorporated into the nutritional composition(s) described herein by any method well-known in the art. In some embodiments, the milk fat globules may be substituted for other oils that are normally included in the fat source of the nutritional composition. For example, the milk fat globules may be substituted for vegetable oils, such as palm olein, soy, coconut, and high oleic sunflower oils.

In some embodiments, the milk fat globules may be added to the nutritional composition by replacing an equivalent amount of the rest of the overall fat blend normally present in the nutritional composition. In some embodiments, a certain amount of oil used as a fat source, that does not contain the milk fat globules described herein may be substituted with milk fat globules. In yet another embodiment, the nutritional composition may be supplemented with the milk fat globules. In some embodiments, the milk fat globules may be the sole fat source added to the nutritional composition.

In one embodiment, where the nutritional composition is an infant formula, the milk fat globules derived from milk may be added to a commercially available infant formula. For example, Enfalac, Enfamil®, Enfamil® Premature Formula, Enfamil® with Iron, Enfamil® LIPIL®, Lactofree®, Nutramigen®, Pregestimil®, and ProSobee® (available from Mead Johnson Nutrition Company, Glenview, Ill., U.S.) may be supplemented with the milk fat globules derived from milk, and used in practice of the current disclosure.

The nutritional composition(s) of the present disclosure may also comprise a carbohydrate source. Carbohydrate sources can be any used in the art, e.g., lactose, glucose, fructose, corn syrup solids, maltodextrins, sucrose, starch, rice syrup solids, and the like. The amount of carbohydrate in the nutritional composition typically can vary from between about 5 g and about 25 g/100 kcal. In some embodiments, the amount of carbohydrate is between about 6 g and about 22 g/100 kcal. In other embodiments, the amount of carbohydrate is between about 12 g and about 14 g/100 kcal. In some embodiments, corn syrup solids are preferred. Moreover, hydrolyzed, partially hydrolyzed, and/or extensively hydrolyzed carbohydrates may be desirable for inclusion in the nutritional composition due to their easy digestibility.

Non-limiting examples of carbohydrate materials suitable for use herein include hydrolyzed or intact, naturally or chemically modified, starches sourced from corn, tapioca, rice or potato, in waxy or non-waxy forms. Non-limiting examples of suitable carbohydrates include various hydrolyzed starches characterized as hydrolyzed cornstarch, maltodextrin, maltose, corn syrup, dextrose, corn syrup solids, glucose, and various other glucose polymers and combinations thereof. Non-limiting examples of other suitable carbohydrates include those often referred to as sucrose, lactose, fructose, high fructose corn syrup, indigestible oligosaccharides such as fructooligosaccharides and combinations thereof.

The nutritional composition(s) of the disclosure may also comprise a protein source. The protein source can be any used in the art, e.g., nonfat milk, whey protein, casein, soy protein, hydrolyzed protein, amino acids, and the like. Bovine milk protein sources useful in practicing the present disclosure include, but are not limited to, milk protein powders, milk protein concentrates, milk protein isolates, nonfat milk solids, nonfat milk, nonfat dry milk, whey protein, whey protein isolates, whey protein concentrates, sweet whey, acid whey, casein, acid casein, caseinate (e.g. sodium caseinate, sodium calcium caseinate, calcium caseinate) and any combinations thereof.

In one embodiment, the proteins of the nutritional composition are provided as intact proteins. In other embodiments, the proteins are provided as a combination of both intact proteins and partially hydrolyzed proteins, with a degree of hydrolysis of between about 4% and 10%. In certain other embodiments, the proteins are more completely hydrolyzed. In still other embodiments, the protein source comprises amino acids. In yet another embodiment, the protein source may be supplemented with glutamine-containing peptides.

In a particular embodiment of the nutritional composition, the whey:casein ratio of the protein source is similar to that found in human breast milk. In an embodiment, the protein source comprises from about 40% to about 80% whey protein and from about 20% to about 60% casein.

In some embodiments, the nutritional composition comprises between about 1 g and about 7 g of a protein source per 100 kcal. In other embodiments, the nutritional composition comprises between about 3.5 g and about 4.5 g of protein per 100 kcal.

In some embodiments, the nutritional composition described herein comprises a fat source. The milk fat globules described herein may be the sole fat source or may be used in combination with any other suitable fat or lipid source for the nutritional composition as known in the art. Appropriate fat sources include, but are not limited to, animal sources, e.g., milk fat, butter, butter fat, egg yolk lipid; marine sources, such as fish oils, marine oils, single cell oils; vegetable and plant oils, such as corn oil, canola oil, sunflower oil, soybean oil, palm olein oil, coconut oil, high oleic sunflower oil, evening primrose oil, rapeseed oil, olive oil, flaxseed (linseed) oil, cottonseed oil, high oleic safflower oil, palm stearin, palm kernel oil, wheat germ oil; medium chain triglyceride oils and emulsions and esters of fatty acids; and any combinations thereof.

The disclosed nutritional composition described herein can, in some embodiments, also comprise a source of prebiotics. The term "prebiotic" as used herein refers to indigestible food ingredients which exert health benefits upon the host. Such health benefits may include, but are not limited to, selective stimulation of the growth and/or activity of one or a limited number of beneficial gut bacteria, stimulation of the growth and/or activity of ingested probiotic microorganisms, selective reduction in gut pathogens, and favorable influence on gut short chain fatty acid profile. Such prebiotics may be naturally-occurring, synthetic, or developed through the genetic manipulation of organisms and/or plants, whether such new source is now known or developed later. Prebiotics useful in the present disclosure may include oligosaccharides, polysaccharides, and other prebiotics that contain fructose, xylose, soya, galactose, glucose and mannose.

More specifically, prebiotics useful in the present disclosure may include polydextrose, polydextrose powder, lactulose, lactosucrose, raffinose, gluco-oligosaccharide, inulin, fructo-oligosaccharide, isomalto-oligosaccharide, soybean oligosaccharides, lactosucrose, xylo-oligosaccharide, chito-oligosaccharide, manno-oligosaccharide, aribino-oligosaccharide, siallyl-oligosaccharide, fuco-oligosaccharide, galacto-oligosaccharide, and gentio-oligosaccharides. In one preferred embodiment, the prebiotic comprises galacto-oligosaccharide, polydextrose, or mixtures thereof.

The amount of galacto-oligosaccharide in the nutritional composition may, in an embodiment, be from about 0.1 mg/100 kcal to about 1.0 mg/100 kcal. In another embodiment, the amount of galacto-oligosaccharide in the nutritional composition may be from about 0.1 mg/100 kcal to about 0.5 mg/100 kcal. The amount of polydextrose in the nutritional composition may, in an embodiment, be within the range of from about 0.1 mg/100 kcal to about 0.5 mg/100 kcal. In another embodiment, the amount of polydextrose may be about 0.3 mg/100 kcal. In a particular embodiment, galacto-oligosaccharide and polydextrose are supplemented into the nutritional composition in a total amount of about at least about 0.2 mg/100 kcal and can be about 0.2 mg/100 kcal to about 1.5 mg/100 kcal. In some embodiments, the nutritional composition may comprise galactooligosaccharide and polydextrose in a total amount of from about 0.6 to about 0.8 mg/100 kcal.

The disclosed nutritional composition described herein can, in some embodiments, also comprise a source of probiotic. The term "probiotic" means a microorganism that exerts beneficial effects on the health of the host. Any probiotic known in the art may be acceptable in this embodiment. In a particular embodiment, the probiotic may be selected from any *Lactobacillus* species, *Lactobacillus rhamnosus* GG (ATCC number 53103), *Bifidobacterium* species, *Bifidobacterium longum* BB536 (BL999, ATCC: BAA-999), *Bifidobacterium longum* AH1206 (NCIMB: 41382), *Bifidobacterium breve* AH1205 (NCIMB: 41387), *Bifidobacterium infantis* 35624 (NCIMB: 41003), and *Bifidobacterium animalis* subsp. *lactis* BB-12 (DSM No. 10140) or any combination thereof.

If included, the nutritional composition may comprise between about $1 \times 10^4$ to about $1.5 \times 10^{10}$ cfu of probiotics per 100 kcal, more preferably from about $1 \times 10^6$ to about $1 \times 10^9$ cfu of probiotics per 100 kcal.

In an embodiment, the probiotic(s) may be viable or non-viable. As used herein, the term "viable", refers to live microorganisms. The term "non-viable" or "non-viable probiotic" means non-living probiotic microorganisms, their cellular components and/or metabolites thereof. Such non-viable probiotics may have been heat-killed or otherwise inactivated, but they retain the ability to favorably influence the health of the host. The probiotics useful in the present disclosure may be naturally-occurring, synthetic or developed through the genetic manipulation of organisms, whether such new source is now known or later developed.

In some embodiments the nutritional composition may also include a source of long chain polyunsaturated fatty acids (LCPUFAs). In one embodiment the amount of LCPUFA in the nutritional composition is advantageously at least about 5 mg/100 kcal, and may vary from about 5 mg/100 kcal to about 100 mg/100 kcal, more preferably from about 10 mg/100 kcal to about 50 mg/100 kcal. Non-limiting examples of LCPUFAs include, but are not limited to, DHA, ARA, linoleic (18:2 n-6), γ-linolenic (18:3 n-6), dihomo-γ-linolenic (20:3 n-6) acids in the n-6 pathway, α-linolenic (18:3 n-3), stearidonic (18:4 n-3), eicosatetraenoic (20:4 n-3), eicosapentaenoic (20:5 n-3), and docosapentaenoic (22:6 n-3).

In some embodiments, the LCPUFA included in the nutritional composition may comprise DHA. In one embodiment the amount of DHA in the nutritional composition is advantageously at least about 17 mg/100 kcal, and may vary from about 5 mg/100 kcal to about 75 mg/100 kcal, more preferably from about 10 mg/100 kcal to about 50 mg/100 kcal.

In another embodiment, especially if the nutritional composition is an infant formula, the nutritional composition is supplemented with both DHA and ARA. In this embodiment, the weight ratio of ARA:DHA may be between about 1:3 and about 9:1. In a particular embodiment, the ratio of ARA:DHA is from about 1:2 to about 4:1.

The DHA and ARA can be in natural form, provided that the remainder of the LCPUFA source does not result in any substantial deleterious effect on the infant. Alternatively, the DHA and ARA can be used in refined form.

The disclosed nutritional composition described herein can, in some embodiments, also comprise a source of β-glucan. Glucans are polysaccharides, specifically polymers of glucose, which are naturally occurring and may be found in cell walls of bacteria, yeast, fungi, and plants. Beta glucans (β-glucans) are themselves a diverse subset of glucose polymers, which are made up of chains of glucose monomers linked together via beta-type glycosidic bonds to form complex carbohydrates.

β-1,3-glucans are carbohydrate polymers purified from, for example, yeast, mushroom, bacteria, algae, or cereals. (Stone B A, Clarke A E. Chemistry and Biology of (1-3)-Beta-Glucans. London: Portland Press Ltd; 1993.) The chemical structure of β-1,3-glucan depends on the source of the β-1,3-glucan. Moreover, various physiochemical parameters, such as solubility, primary structure, molecular weight, and branching, play a role in biological activities of β-1,3-glucans. (Yadomae T., *Structure and biological activities of fungal beta-1,3-glucans*. Yakugaku Zasshi. 2000; 120:413-431.)

β-1,3-glucans are naturally occurring polysaccharides, with or without β-1,6-glucose side chains that are found in the cell walls of a variety of plants, yeasts, fungi and bacteria. β-1,3; 1,6-glucans are those containing glucose units with (1,3) links having side chains attached at the (1,6) position(s). β-1,3; 1,6 glucans are a heterogeneous group of glucose polymers that share structural commonalities, including a backbone of straight chain glucose units linked by a β-1,3 bond with β-1,6-linked glucose branches extending from this backbone. While this is the basic structure for the presently described class of β-glucans, some variations may exist. For example, certain yeast β-glucans have additional regions of β(1,3) branching extending from the β(1,6) branches, which add further complexity to their respective structures.

β-glucans derived from baker's yeast, *Saccharomyces cerevisiae*, are made up of chains of D-glucose molecules connected at the 1 and 3 positions, having side chains of glucose attached at the 1 and 6 positions. Yeast-derived β-glucan is an insoluble, fiber-like, complex sugar having the general structure of a linear chain of glucose units with a β-1,3 backbone interspersed with β-1,6 side chains that are generally 6-8 glucose units in length. More specifically, β-glucan derived from baker's yeast is poly-(1,6)-β-D-glucopyranosyl-(1,3)-β-D-glucopyranose.

Furthermore, β-glucans are well tolerated and do not produce or cause excess gas, abdominal distension, bloating or diarrhea in pediatric subjects. Addition of β-glucan to a nutritional composition for a pediatric subject, such as an infant formula, a growing-up milk or another children's nutritional product, will improve the subject's immune response by increasing resistance against invading pathogens and therefore maintaining or improving overall health.

In some embodiments, the β-glucan is β-1,3; 1,6-glucan. In some embodiments, the β-1,3; 1,6-glucan is derived from baker's yeast. The nutritional composition may comprise whole glucan particle β-glucan, particulate β-glucan, PGG-glucan (poly-1,6-β-D-glucopyranosyl-1,3-β-D-glucopyranose) or any mixture thereof.

In some embodiments, the amount of β-glucan in the nutritional composition is between about 3 mg and about 17 mg per 100 kcal. In another embodiment the amount of β-glucan is between about 6 mg and about 17 mg per 100 kcal.

The disclosed nutritional composition described herein, can, in some embodiments also comprise an effective amount of iron. The iron may comprise encapsulated iron forms, such as encapsulated ferrous fumarate or encapsulated ferrous sulfate or less reactive iron forms, such as ferric pyrophosphate or ferric orthophosphate.

One or more vitamins and/or minerals may also be added in to the nutritional composition in amounts sufficient to supply the daily nutritional requirements of a subject. It is to be understood by one of ordinary skill in the art that vitamin and mineral requirements will vary, for example, based on the age of the child. For instance, an infant may have different vitamin and mineral requirements than a child between the ages of one and thirteen years. Thus, the embodiments are not intended to limit the nutritional composition to a particular age group but, rather, to provide a range of acceptable vitamin and mineral components.

In embodiments providing a nutritional composition for a child, the composition may optionally include, but is not limited to, one or more of the following vitamins or derivations thereof: vitamin $B_1$ (thiamin, thiamin pyrophosphate, TPP, thiamin triphosphate, TTP, thiamin hydrochloride, thiamin mononitrate), vitamin $B_2$ (riboflavin, flavin mononucleotide, FMN, flavin adenine dinucleotide, FAD, lactoflavin, ovoflavin), vitamin $B_3$ (niacin, nicotinic acid, nicotinamide, niacinamide, nicotinamide adenine dinucleotide, NAD, nicotinic acid mononucleotide, NicMN, pyridine-3-carboxylic acid), vitamin $B_3$-precursor tryptophan, vitamin $B_6$ (pyridoxine, pyridoxal, pyridoxamine, pyridoxine hydrochloride), pantothenic acid (pantothenate, panthenol), folate (folic acid, folacin, pteroylglutamic acid), vitamin $B_{12}$ (cobalamin, methylcobalamin, deoxyadenosylcobalamin, cyanocobalamin, hydroxycobalamin, adenosylcobalamin), biotin, vitamin C (ascorbic acid), vitamin A (retinol, retinyl acetate, retinyl palmitate, retinyl esters with other long-chain fatty acids, retinal, retinoic acid, retinol esters), vitamin D (calciferol, cholecalciferol, vitamin $D_3$, 1,25,-dihydroxyvitamin D), vitamin E (α-tocopherol, α-tocopherol acetate, α-tocopherol succinate, α-tocopherol nicotinate, α-tocopherol), vitamin K (vitamin $K_1$, phylloquinone, naphthoquinone, vitamin $K_2$, menaquinone-7, vitamin $K_3$, menaquinone-4, menadione, menaquinone-8, menaquinone-8H, menaquinone-9, menaquinone-9H, menaquinone-10, menaquinone-11, menaquinone-12, menaquinone-13), choline, inositol, β-carotene and any combinations thereof.

In embodiments providing a children's nutritional product, such as a growing-up milk, the composition may optionally include, but is not limited to, one or more of the following minerals or derivations thereof: boron, calcium, calcium acetate, calcium gluconate, calcium chloride, calcium lactate, calcium phosphate, calcium sulfate, chloride, chromium, chromium chloride, chromium picolonate, copper, copper sulfate, copper gluconate, cupric sulfate, fluoride, iron, carbonyl iron, ferric iron, ferrous fumarate, ferric orthophosphate, iron trituration, polysaccharide iron, iodide, iodine, magnesium, magnesium carbonate, magnesium hydroxide, magnesium oxide, magnesium stearate, magnesium sulfate, manganese, molybdenum, phosphorus, potassium, potassium phosphate, potassium iodide, potassium chloride, potassium acetate, selenium, sulfur, sodium, docusate sodium, sodium chloride, sodium selenate, sodium molybdate, zinc, zinc oxide, zinc sulfate and mixtures thereof. Non-limiting exemplary derivatives of mineral compounds include salts, alkaline salts, esters and chelates of any mineral compound.

The minerals can be added to growing-up milks or to other children's nutritional compositions in the form of salts such as calcium phosphate, calcium glycerol phosphate, sodium citrate, potassium chloride, potassium phosphate, magnesium phosphate, ferrous sulfate, zinc sulfate, cupric sulfate, manganese sulfate, and sodium selenite. Additional vitamins and minerals can be added as known within the art.

The nutritional compositions of the present disclosure may optionally include one or more of the following flavoring agents, including, but not limited to, flavored extracts, volatile oils, cocoa or chocolate flavorings, peanut butter flavoring, cookie crumbs, vanilla or any commercially available flavoring. Examples of useful flavorings include, but are not limited to, pure anise extract, imitation banana extract, imitation cherry extract, chocolate extract, pure lemon extract, pure orange extract, pure peppermint extract, honey, imitation pineapple extract, imitation rum extract, imitation strawberry extract, or vanilla extract; or volatile oils, such as balm oil, bay oil, bergamot oil, cedarwood oil, cherry oil, cinnamon oil, clove oil, or peppermint oil; peanut butter, chocolate flavoring, vanilla cookie crumb, butterscotch, toffee, and mixtures thereof. The amounts of flavoring agent can vary greatly depending upon the flavoring agent used. The type and amount of flavoring agent can be selected as is known in the art.

The nutritional compositions of the present disclosure may optionally include one or more emulsifiers that may be added for stability of the final product. Examples of suitable emulsifiers include, but are not limited to, lecithin (e.g., from egg or soy), alpha lactalbumin and/or mono- and di-glycerides, and mixtures thereof. Other emulsifiers are readily apparent to the skilled artisan and selection of suitable emulsifier(s) will depend, in part, upon the formulation and final product.

The nutritional compositions of the present disclosure may optionally include one or more preservatives that may also be added to extend product shelf life. Suitable preservatives include, but are not limited to, potassium sorbate, sodium sorbate, potassium benzoate, sodium benzoate, calcium disodium EDTA, and mixtures thereof.

The nutritional compositions of the present disclosure may optionally include one or more stabilizers. Suitable stabilizers for use in practicing the nutritional composition of the present disclosure include, but are not limited to, gum arabic, gum ghatti, gum karaya, gum tragacanth, agar, furcellaran, guar gum, gellan gum, locust bean gum, pectin, low methoxyl pectin, gelatin, microcrystalline cellulose, CMC (sodium carboxymethylcellulose), methylcellulose hydroxypropyl methyl cellulose, hydroxypropyl cellulose, DATEM (diacetyl tartaric acid esters of mono- and diglycerides), dextran, carrageenans, and mixtures thereof.

The nutritional compositions of the disclosure may provide minimal, partial or total nutritional support. The compositions may be nutritional supplements or meal replacements. The compositions may, but need not, be nutritionally complete. In an embodiment, the nutritional composition of the disclosure is nutritionally complete and contains suitable types and amounts of lipid, carbohydrate, protein, vitamins and minerals. The amount of lipid or fat typically can vary from about 1 to about 25 g/100 kcal. The amount of protein typically can vary from about 1 to about 7 g/100 kcal. The amount of carbohydrate typically can vary from about 6 to about 22 g/100 kcal.

In an embodiment, the children's nutritional composition may contain between about 10 and about 50% of the maximum dietary recommendation for any given country, or between about 10 and about 50% of the average dietary recommendation for a group of countries, per serving of vitamins A, C, and E, zinc, iron, iodine, selenium, and choline. In another embodiment, the children's nutritional composition may supply about 10-30% of the maximum dietary recommendation for any given country, or about 10-30% of the average dietary recommendation for a group of countries, per serving of B-vitamins. In yet another embodiment, the levels of vitamin D, calcium, magnesium, phosphorus, and potassium in the children's nutritional product may correspond with the average levels found in milk. In other embodiments, other nutrients in the children's nutritional composition may be present at about 20% of the maximum dietary recommendation for any given country, or about 20% of the average dietary recommendation for a group of countries, per serving.

In some embodiments the nutritional composition is an infant formula. Infant formulas are fortified nutritional compositions for an infant. The content of an infant formula is dictated by federal regulations, which define macronutrient, vitamin, mineral, and other ingredient levels in an effort to simulate the nutritional and other properties of human breast milk. Infant formulas are designed to support overall health and development in a pediatric human subject, such as an infant or a child.

In some embodiments, the nutritional composition of the present disclosure is a growing-up milk. Growing-up milks are fortified milk-based beverages intended for children over 1 year of age (typically from 1-3 years of age, from 4-6 years of age or from 1-6 years of age). They are not medical foods and are not intended as a meal replacement or a supplement to address a particular nutritional deficiency. Instead, growing-up milks are designed with the intent to serve as a complement to a diverse diet to provide additional insurance that a child achieves continual, daily intake of all essential vitamins and minerals, macronutrients plus additional functional dietary components, such as non-essential nutrients that have purported health-promoting properties.

The exact composition of a growing-up milk or other nutritional composition according to the present disclosure can vary from market-to-market, depending on local regulations and dietary intake information of the population of interest. In some embodiments, nutritional compositions according to the disclosure consist of a milk protein source, such as whole or skim milk, plus added sugar and sweeteners to achieve desired sensory properties, and added vitamins and minerals. The fat composition includes milk fat globules derived from milk. Total protein can be targeted to match that of human milk, cow milk or a lower value. Total carbohydrate is usually targeted to provide as little added sugar, such as sucrose or fructose, as possible to achieve an acceptable taste. Typically, Vitamin A, calcium and Vitamin D are added at levels to match the nutrient contribution of regional cow milk. Otherwise, in some embodiments, vitamins and minerals can be added at levels that provide approximately 20% of the dietary reference intake (DRI) or 20% of the Daily Value (DV) per serving. Moreover, nutrient values can vary between markets depending on the identified nutritional needs of the intended population, raw material contributions and regional regulations.

The disclosed nutritional composition(s) may be provided in any form known in the art, such as a powder, a gel, a suspension, a paste, a solid, a liquid, a liquid concentrate, a reconstituteable powdered milk substitute or a ready-to-use product. The nutritional composition may, in certain embodiments, comprise a nutritional supplement, children's nutritional product, infant formula, human milk fortifier, growing-up milk or any other nutritional composition designed for an infant or a pediatric subject. Nutritional compositions of the present disclosure include, for example, orally-ingestible, health-promoting substances including, for example, foods, beverages, tablets, capsules and powders. Moreover, the nutritional composition of the present disclosure may be standardized to a specific caloric content, it may be provided as a ready-to-use product, or it may be provided in a concentrated form. In some embodiments, the nutritional composition is in powder form with a particle size in the range of 5 µm to 1500 µm, more preferably in the range of 10 µm to 300 µm.

In some embodiments, the disclosure is directed to a method for promoting lipid digestion in a pediatric subject, the method comprising providing to the pediatric subject a nutritional composition comprising a carbohydrate source, a protein source, and a fat source comprising milk fat globules.

In some embodiments, providing the pediatric subject a nutritional composition comprising a fat source with the milk fat globules described herein will aid in protein digestion. Without being bound by any particular theory, it is believed that the proteins will not surround and encapsulate the milk fat globules, since the globules may be stabilized with other components, such as phospholipids. Accordingly, there will be fewer proteins at the interface between the lipid molecules and water, which allow for easier access to protein molecules by digestional proteases.

Additionally, the inclusion of the milk fat globules described herein in the nutritional composition may aid in the release of DHA, ARA and other fatty acids as well as fat soluble nutrients included in the nutritional composition. The milk fat globules are more easily accessible by digestional lipases, which facilitate the release of DHA, ARA and other fatty acids contained within the milk fat globules.

Additionally, in some embodiments of the method described herein, the nutritional composition provided is an infant formula comprising milk fat globules derived from milk.

All combinations of method or process steps as used herein can be performed in any order, unless otherwise specified or clearly implied to the contrary by the context in which the referenced combination is made.

The methods and compositions of the present disclosure, including components thereof, can comprise, consist of, or consist essentially of the essential elements and limitations of the embodiments described herein, as well as any additional or optional ingredients, components or limitations described herein or otherwise useful in nutritional compositions.

Formulation examples are provided to illustrate some embodiments of the nutritional composition of the present disclosure but should not be interpreted as any limitation thereon. Other embodiments within the scope of the claims herein will be apparent to one skilled in the art from the consideration of the specification or practice of the nutritional composition or methods disclosed herein. It is intended that the specification, together with the example, be considered to be exemplary only, with the scope and spirit of the disclosure being indicated by the claims which follow the example.

Formulation Examples

Table 1

Table 1, illustrated below, provides an example embodiment of the nutritional profile of an enriched lipid fraction of the present disclosure and describes the amount of each ingredient to be included per 100 kcal serving of nutritional composition.

TABLE 1

Nutrition profile of an example enriched lipid fraction

| Nutrient/Lipid | per 100 kcal | |
|---|---|---|
| | Minimum | Maximum |
| Total Lipid Content (g) | 1.35 | 26.3 |
| Saturated fatty acid (g) | 0.1 | 7.2 |
| Trans-fatty acid (g) | 0.2 | 5.2 |
| OBCFAs (g) | 0.05 | 1 |
| CLA (g) | 0.05 | 1 |
| BCFA (g) | 0.05 | 1 |
| Cholesterol (mg) | 100 | 400 |
| Milk Phospholipids (mg) | 50 | 500 |

Table 2

Table 2, shown below, provides an example of a nutritional composition according to the present disclosure and describes the amount of each ingredient to be included per 100 kcal serving.

TABLE 2

Nutrition profile of an example nutritional composition

| Nutrient/Lipid | per 100 kcal | |
|---|---|---|
| | Minimum | Maximum |
| Protein (g) | 1.2 | 6.8 |
| Fat total including enriched lipid fraction (g) | 1.4 | 10.3 |
| Carbohydrates (g) | 6 | 22 |
| Prebiotic (g) | 0.3 | 1.2 |
| DHA (mg) | 4 | 32 |
| Beta glucan (mg) | 2.9 | 17 |
| Saturated Fatty acids (g) | 0.1 | 2.3 |
| Trans-fatty acid (g) | 0.1 | 1.2 |
| OBCFAs (g) | 0.05 | 1.0 |
| CLA (g) | 0.05 | 1.0 |
| Cholesterol (mg) | 100 | 400 |
| Milk Phospholipids (mg) | 50 | 500 |
| Phosphotidylcholine (mg) | 130 | 400 |
| SphingoMyelin (mg) | 5 | 60 |
| BCFAs (g) | 0.3 | 2.3 |
| Probiotics (cfu) | $9.60 \times 10^5$ | $3.80 \times 10^8$ |
| Vitamin A (IU) | 134 | 921 |
| Vitamin D (IU) | 22 | 126 |
| Vitamin E (IU) | 0.8 | 5.4 |
| Vitamin K (mcg) | 2.9 | 18 |
| Thiamin (mcg) | 63 | 328 |
| Riboflavin (mcg) | 68 | 420 |
| Vitamin B6 (mcg) | 52 | 397 |
| Vitamin B12 (mcg) | 0.2 | 0.9 |
| Niacin (mcg) | 690 | 5881 |
| Folic acid (mcg) | 8 | 66 |
| Panthothenic acid (mcg) | 232 | 1211 |
| Biotin (mcg) | 1.4 | 5.5 |

TABLE 2-continued

Nutrition profile of an example nutritional composition

| Nutrient/Lipid | per 100 kcal | |
|---|---|---|
| | Minimum | Maximum |
| Vitamin C (mg) | 4.9 | 24 |
| Choline (mg) | 4.9 | 43 |
| Calcium (mg) | 68 | 297 |
| Phosphorus (mg) | 54 | 210 |
| Magnesium (mg) | 4.9 | 34 |
| Sodium (mg) | 24 | 88 |
| Potassium (mg) | 82 | 346 |
| Chloride (mg) | 53 | 237 |
| Iodine (mcg) | 8.9 | 79 |
| Iron (mg) | 0.7 | 2.8 |
| Zinc (mg) | 0.7 | 2.4 |
| Manganese (mcg) | 7.2 | 41 |
| Copper (mcg) | 16 | 331 |

Table 3

Table 3, provided below, is an example of a nutritional composition according to the present disclosure and describes the amount of each ingredient to be included per 100 kcal serving.

TABLE 3

Nutrition profile of an example nutritional composition

| Nutrient/Lipid | per 100 kcal | |
|---|---|---|
| | Minimum | Maximum |
| Protein (g) | 1.8 | 6.8 |
| Carbohydrates (g) | 6 | 22 |
| Fat total including enriched lipid fraction (g) | 1.4 | 10.3 |
| Enriched lipid fraction (g) | 0.2 | 10.3 |
| Prebiotic (g) | 0.3 | 1.2 |
| DHA (mg) | 4 | 32 |
| Beta glucan (mg) | 2.9 | 17 |
| Probiotics (cfu) | $9.60 \times 10^5$ | $3.80 \times 10^8$ |
| Vitamin A (IU) | 134 | 921 |
| Vitamin D (IU) | 22 | 126 |
| Vitamin E (IU) | 0.8 | 5.4 |
| Vitamin K (mcg) | 2.9 | 18 |
| Thiamin (mcg) | 63 | 328 |
| Riboflavin (mcg) | 68 | 420 |
| Vitamin B6 (mcg) | 52 | 397 |
| Vitamin B12 (mcg) | 0.2 | 0.9 |
| Niacin (mcg) | 690 | 5881 |
| Folic acid (mcg) | 8 | 66 |
| Panthothenic acid (mcg) | 232 | 1211 |
| Biotin (mcg) | 1.4 | 5.5 |
| Vitamin C (mg) | 4.9 | 24 |
| Choline (mg) | 4.9 | 43 |
| Calcium (mg) | 68 | 297 |
| Phosphorus (mg) | 54 | 210 |
| Magnesium (mg) | 4.9 | 34 |
| Sodium (mg) | 24 | 88 |
| Potassium (mg) | 82 | 346 |
| Chloride (mg) | 53 | 237 |
| Iodine (mcg) | 8.9 | 79 |
| Iron (mg) | 0.7 | 2.8 |
| Zinc (mg) | 0.7 | 2.4 |
| Manganese (mcg) | 7.2 | 41 |
| Copper (mcg) | 16 | 331 |

Table 4

Table 4, provided below, is an example of a nutritional composition according to the present disclosure and describes the amount of each ingredient to be included per 100 grams of nutritional composition.

TABLE 4

Nutrition profile of an example nutritional composition

| INGREDIENT | Amount g/100 g |
|---|---|
| Lactose | 40.26 |
| Fat bulk blend | 20.6 |
| Whey protein concentrate | 17.71 |
| Milk nonfat dry | 7.6 |
| Fractionated milk fat | 5.12 |
| Galacto-oligosaccharide | 3.678 |
| Lecithin FCC K | 0.794 |
| Fungal-Algal oil | 0.716 |
| Calcium carbonate | 0.45 |
| Choline chloride PWD | 0.17 |
| Potassium citrate | 0.12 |
| Calcium phosphate | 0.11 |
| Potassium chloride | 0.018 |
| Magnesium oxide | 0.013 |
| L-carnitine K | 0.011 |
| Sodium Chloride 40-60 MESH | 0.006 |
| Vitamin and Mineral Premix | 0.72 |
| Polydextrose powder | 1.85 |
| Nucleotide premix | 0.16 |

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references.

Although embodiments of the disclosure have been described using specific terms, devices, and methods, such description is for illustrative purposes only. The words used are words of description rather than of limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the versions contained therein.

What is claimed is:

1. A powdered a nutritional composition comprising:
   a carbohydrate source;
   a lipid or fat source, wherein the lipid or fat source comprises milk fat globules formed from an enriched lipid fraction derived from bovine milk that has been subjected to a fractionation procedure, further wherein the milk fat globules comprise based on the total weight of the lipids present in the milk fat globules 49.2 wt % saturated fatty acids, 40.7 wt % mono-unsaturated fatty acids, and 4.4 wt % poly-unsaturated fatty acids;
   a protein source; and
   a preservative.

2. The composition of claim 1, wherein the milk fat globules comprise based on the total weight of fatty acids present in the milk fat globules 5 wt % trans fatty acids.

3. The composition of claim 1, wherein the milk fat globules comprise based on the total weight of fatty acids present in the milk fat globules 0.8 wt % conjugated linoleic acid.

4. The composition of claim 1, wherein the milk fat globules comprise based on the total weight of fatty acids present in the milk fat globules 0.4 wt. % cholesterol.

5. The composition of claim 1, wherein the milk fat globules comprise based on the total weight of fatty acids present in the milk fat globules 0.2 wt. % phospholipids.

6. The composition of claim 1, wherein the average diameter of the milk fat globules is at least about 2 μm.

7. The composition of claim 1, wherein the average diameter of the milk fat globules range is in the range of about 2 μm to about 13 μm.

8. The composition of claim 1, wherein the average diameter of the milk fat globules range is in the range of about 3 μm to about 6 μm.

9. The composition of claim 1, wherein the specific surface area of the milk fat globules range is in the range of about 0.9 $m^2/g$ to about 3 $m^2/g$.

10. The composition of claim 1, further comprising docosahexaenoic acid.

11. The composition of claim 1, further comprising at least one prebiotic.

12. The composition of claim 11, wherein the at least one prebiotic is selected from the group consisting of polydextrose, galactooligosaccharides, and combinations thereof.

13. The composition of claim 12, wherein polydextrose and galactooligosaccharides are added to the nutritional composition in an amount of at least about 0.2 mg/100 kcal to about 1.5 mg/100 kcal.

14. The composition of claim 1, further comprising β-glucan.

15. The composition of claim 1, further comprising a source of iron.

16. The composition of claim 1, wherein the fractionation procedure is melt fractionation.

17. A powdered nutritional composition comprising:
a carbohydrate source;
a lipid or fat source, wherein the lipid or fat source comprises milk fat globules formed from an enriched lipid fraction derived from bovine milk that has been subjected to a fractionation procedure, further wherein the milk fat globules comprise based on the total weight of the lipids present in the milk fat globules 50.7 wt. % saturated fatty acids, 35.4 wt. % mono-unsaturated fatty acids, 4.4% poly-unsaturated fatty acids, and 4.3 wt % trans fatty acids;
a protein source; and
a preservative.

18. The nutritional composition of claim 17, wherein the milk fat globules further comprise 0.8 wt % conjugated linoleic acid.

19. The composition of claim 17, wherein the fractionation procedure is supercritical fluid fractionation.

20. The composition of claim 1, wherein the milk fat globules further comprise 5 wt. % trans fatty acids; 0.8 wt. % conjugated linoleic acid; 0.4 wt % cholesterol; and 0.2 wt % phospholipids.

* * * * *